A. A. DE LOACH.
SAWMILL SET WORKS.
APPLICATION FILED JAN. 6, 1906.
No. 899,159.
Patented Sept. 22, 1908.
4 SHEETS—SHEET 2.
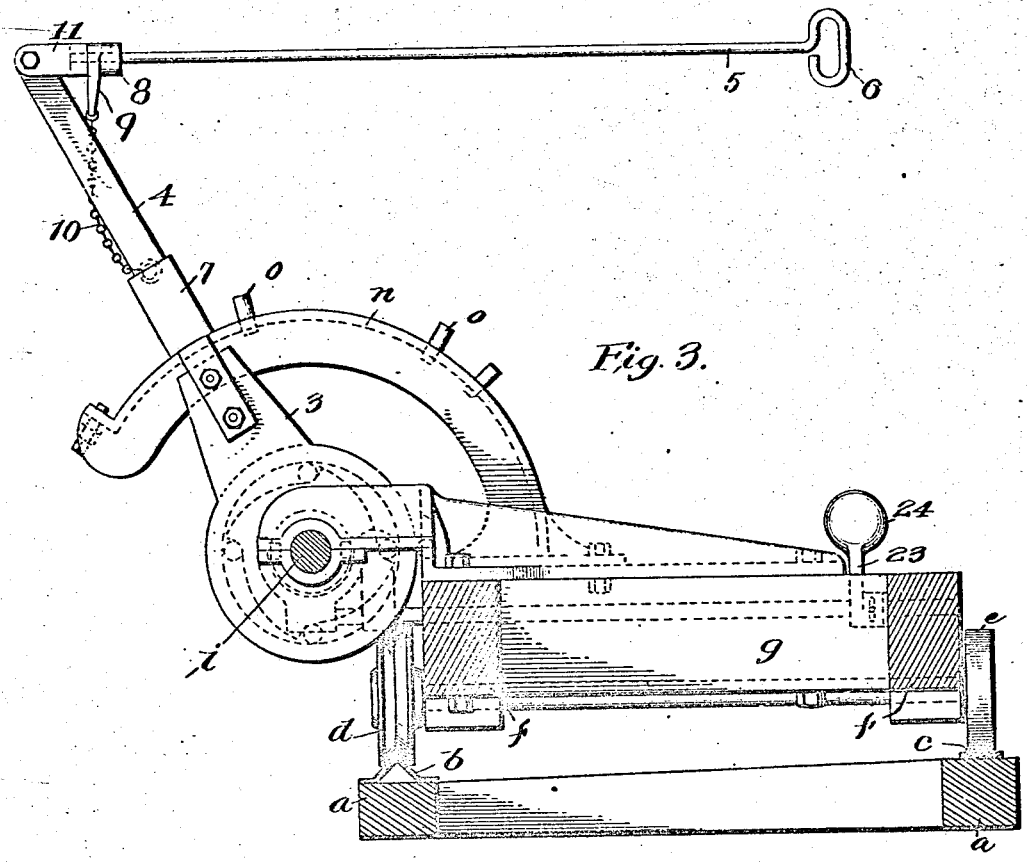
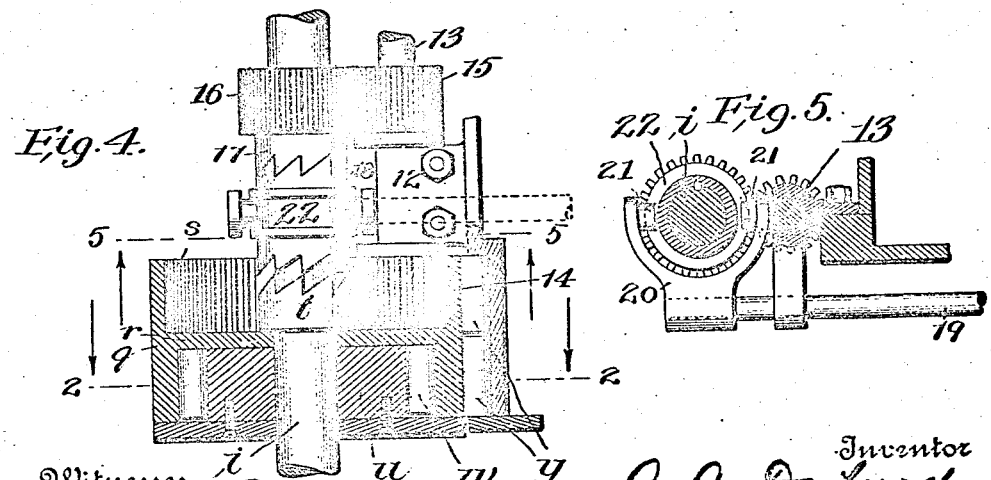

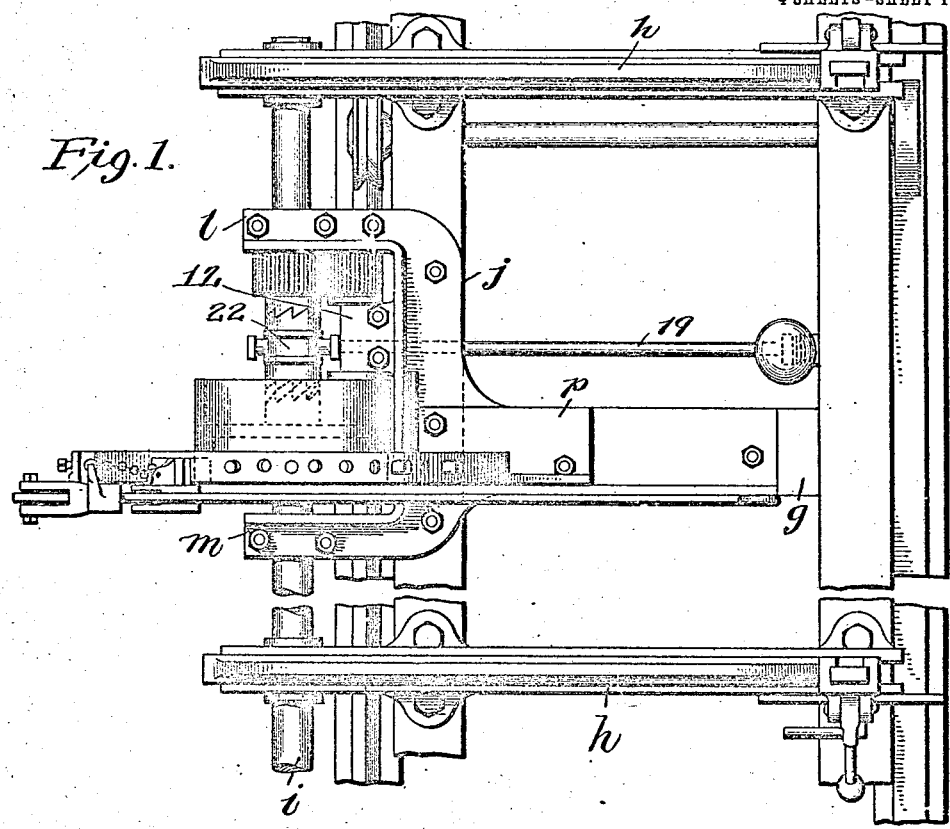
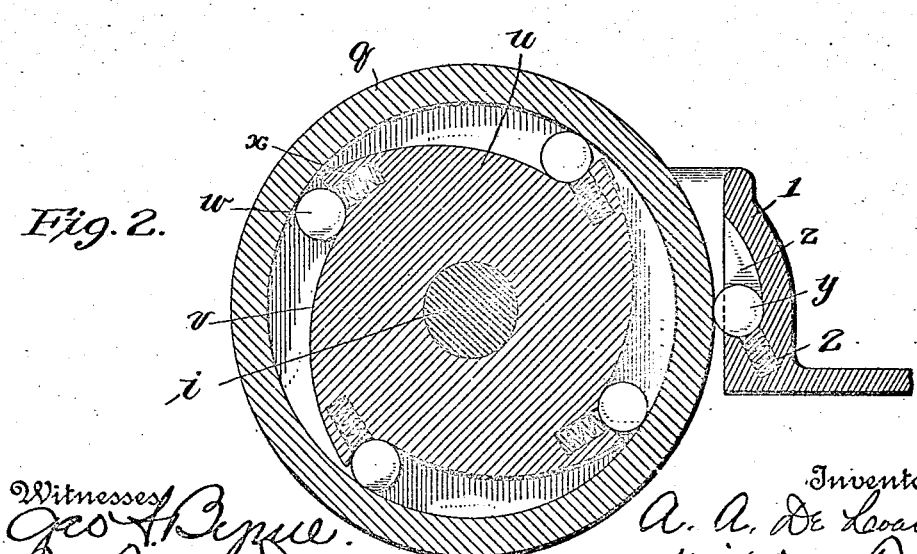

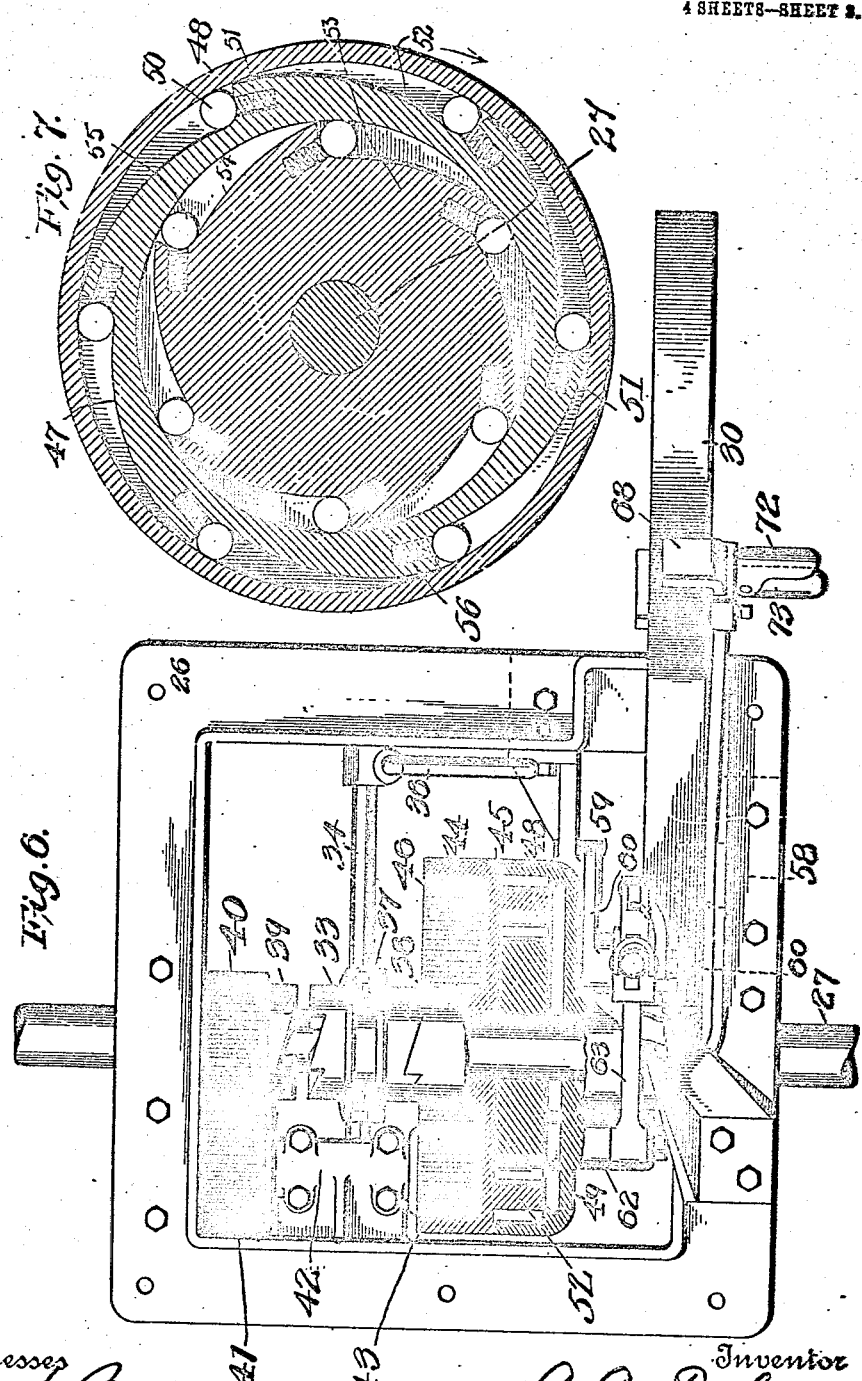

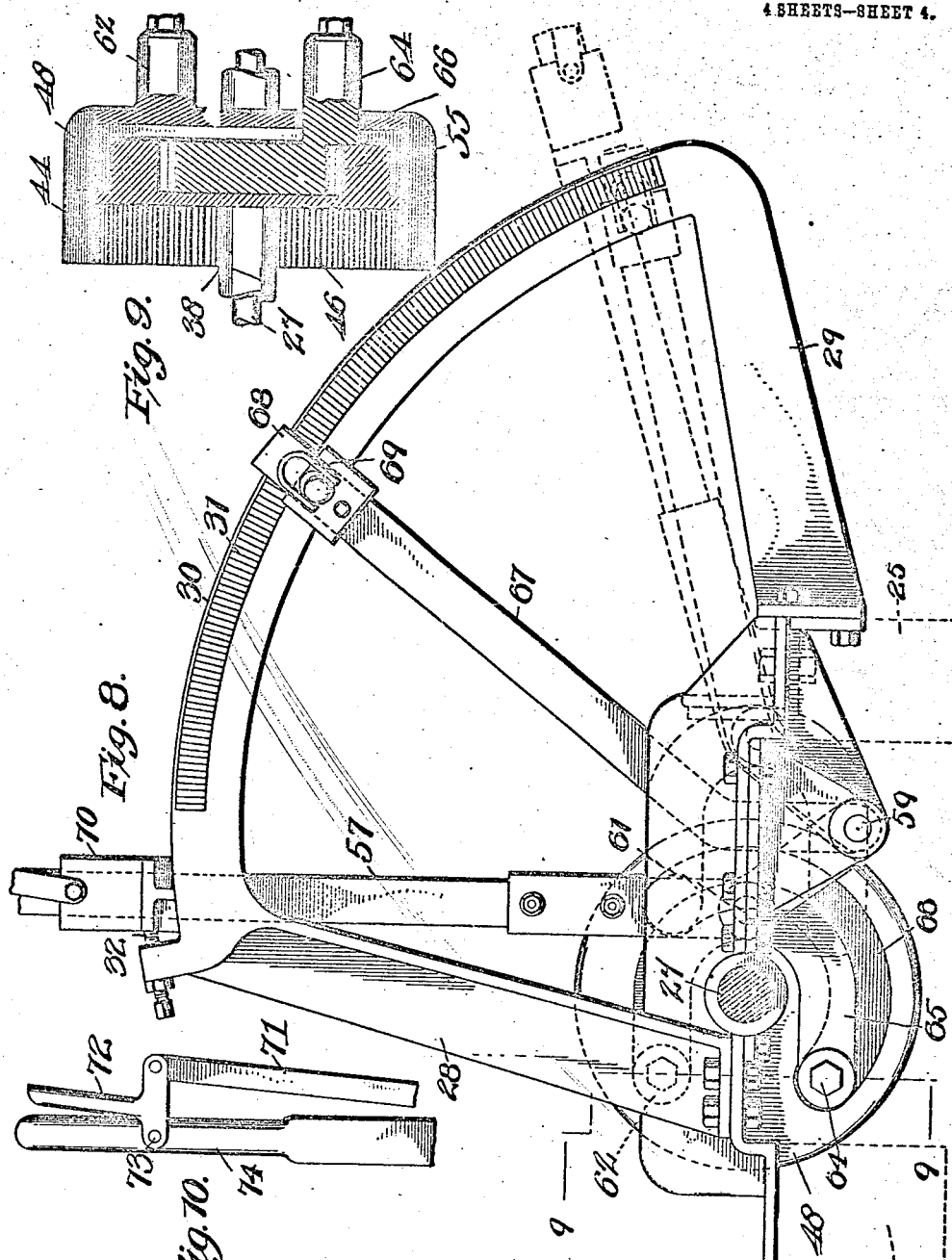

UNITED STATES PATENT OFFICE.

ALONZO AARON DE LOACH, OF ATLANTA, GEORGIA.

SAWMILL SET-WORKS.

No. 899,159.         Specification of Letters Patent.         Patented Sept. 22, 1908.

Application filed January 6, 1906. Serial No. 294,932.

*To all whom it may concern:*

Be it known that I, ALONZO A. DE LOACH, a citizen of the United States, residing at Atlanta, in the county of Fulton and State of Georgia, have invented certain new and useful Improvements in Sawmill Set-Works; and I do hereby declare the following to be a full, clear, and exact description of the invention, such as will enable others skilled in the art to which it appertains to make and use the same.

My invention relates to improvements in saw mill set works, and the object of my invention is to produce set-works operated by friction connections, thus doing away with the lost motion incident to the numerous joints and bearings of ratchet set-works.

With this object in view, my invention consists in the construction and combinations of parts as hereinafter described and claimed.

In the accompanying drawings:—Figure 1 is a top plan view of a saw mill carriage showing my set-works applied thereto. Fig. 2 is a cross section of the friction devices taken on the line 2—2 of Fig. 4. Fig. 3 is an end view of the set works, the carriage beams and rails being shown in cross section. Fig. 4 is an enlarged plan view partly in section showing the gearing and friction devices. Fig. 5 is a cross section on the line 5—5 of Fig. 4. Fig. 6 is a plan view of a modified form partly in section. Fig. 7 is a cross section on an enlarged scale of the clutch devices. Fig. 8 is an end view of the modified form, the set shaft being shown in cross section. Fig. 9 is a cross section of the friction devices on the line 9—9 of Fig. 8, and Fig. 10 is a detail view showing the upper part of the operating lever.

In Figs. 1 to 5, *a* represents beams supporting the rails *b* and *c*, the rail *b* being triangular in cross section, with its point entering a grooved wheel *d* on the saw mill carriage. The other wheel *e* of the carriage is of the ordinary type.

*f* represents the side beams of the carriage, and *g* one of the cross beams thereon.

*h* represents the ordinary knees carrying the adjusting dogs, and *i* represents the set shaft.

Bolted or otherwise firmly fastened to the cross beam *g* and side beam *f* is a casting *j* made right angled to fit over said beams, and provided with projecting arms *l* and *m*, which furnish supports for the set shaft and operating gearing.

*n* is a quadrant provided with holes at graduated distances on its outer face, in which stop pins *o* may be placed. This quadrant is provided with an enlarged foot *p* bolted or otherwise secured to the casting *j*.

Running loosely on the set shaft is a casing *q* provided with a central web *r*, and having open faces on each side of this web. One of these faces is provided with gear teeth *s*. To the central web *r* is fastened the clutch faced member *t*. Within the other face of the casing *q* is mounted a disk *u* having recesses *v* in its outer face, and between the disk *u* and the casing are antifriction rollers *w*, preferably four or six in number, and springs *x*, tend normally to force said rollers outward against the casing *q* so as to produce a wedging action between said casing and the disk *u*. It is obvious that if the disk *u* is turned in the direction of the hands of a watch from the position shown in Fig. 2, the rollers *w* will exert a wedging action on the casing *q*, and the latter will be carried along with the disk *u*. On the other hand, if the disk *u* revolves in the opposite direction, it will have no effect upon the case *q*. To insure, however, that the casing *q* shall not rotate on the left handed motion of the disk *u*, I have provided antifriction rollers *y* located in a recess *z* on the upwardly projecting portion 1 of the casing *j*. Springs 2 keep the rollers *y* always in contact with the casing *q*. The disk *u* is provided with an upwardly extending projection 3, to which the operating lever 4 is bolted or otherwise fastened. 5 represents an operating handle for said lever, provided with a hand hold 6.

7 represents a stop block slidably mounted on the lever 4, and adapted to engage with one of the pins *o*. Sometimes, however, it is desirable to move the lever 4 nearly the full length of the quadrant, and to obviate the necessity of pulling out the pins *o*, I have provided means for lifting the stop block 7, so that it may pass over the pins *o*, said means consisting of a hub 8 fixed to the rod 5, and provided with a projecting arm 9, which is connected by a chain 10 with the stop block 7. The rod 5 of course rotates freely in the link 11, which is pivoted to the upper end of the lever 4, and the arm 9 in the position shown in Fig. 3 prevents the rod 5 from dropping down. It is obvious that a movement of the lever 4 to the right from the position shown in Fig. 3, will move the disk *u* like the movement of the hand of a watch, and this disk will carry with it the casing q and clutch faced member t, but that the reverse movement of said lever 4 will have no effect upon the casing q.

In bearings such as 12 on the casting j is carried a short shaft 13 which is provided with two gear wheels 14 and 15, the gear wheel 14 meshing with the gear teeth s, and the gear wheel 15 meshing with the gear wheel 16 which runs loosely on the set shaft i. The hub of the gear wheel 16 is extended, forming a clutch faced member 17.

18 represents a clutch keyed to the set shaft i, but slidably mounted thereon, and provided with a clutch face at each end thereof, adapted to engage the clutches t and 17 alternately. The clutch 18 is slidably mounted on the shaft i, and may be shifted back and forth by means of the rod 19 which is provided with a fork 20 having pins 21 engaging in a groove 22 in the clutch. The rod 19 is provided with a vertical arm 23, having a weight 24, so that said rod will remain in either of its adjusted positions.

The parts being in the position shown in Fig. 1, it is obvious that a movement of the lever 4 to the right will through the medium of the gears s, 14, 15, 16, and the clutches 17 and 18, move the set shaft i opposite to the hands of a watch, producing the reversing motion of the knees and dogs. On the other hand, if the clutch 18 is shifted so that it will be disengaged from the clutch 17 and engaged with the clutch t, it will move the disk u in the direction of movement of the hands of a watch, producing the ordinary setting motion. The movement of the lever 4 to the left produces no effect on the set-works. The gearing is so proportioned that the reversing motion is about three times as fast as the setting motion.

In the form shown in Figs. 1 to 5, a single acting friction set-works is shown, and in the form shown in Figs. 6 to 10, a double acting friction set works is shown, which will now be described.

In Fig. 8, the dotted lines 25 represent a part of the carriage frame, to which is securely bolted or otherwise firmly secured a casting 26, provided with bearings through which passes the set shaft 27, which casting supports the set-works. To the casting 26 is bolted or otherwise secured a casting composed of the two arms 28 and 29 connected by the quadrant shaped portion 30, provided with a scale 31, and a stop screw 32. Keyed to the shaft 27, but slidably mounted thereon, is a clutch 33 which is moved by means of the rod 34, provided with a lever 36 and an ordinary fork 37, such as already described. This clutch is adapted to engage either with a clutch 38 on the friction part of the device as shown in Fig. 6, or with a clutch 39 on the bearing of the gear wheel 40, which meshes with a gear wheel 41 carried on a short shaft mounted in bearings such as 42. This shaft also carries a gear wheel 43, the parts thus described being similar to those described in connection with the single acting form.

44 represents a casing open at both sides, provided with an internal web 45, which carries the clutch 38. On one side of the web internal gear teeth 46 are provided, which mesh with the gear wheel 43. On the other side of the web 45 the projecting part 52 of the casing 44 is provided on its outside with inclined faces 47, and the interior of said projecting portion is circular. Surrounding said inclined faces is a casing 48 made in the form of a hollow cylinder, and having a closed end 49. Between the inclined faces 47 and the casing 48 are located a series of antifriction rollers 50, preferably four or six in number, and in connection with each roller a spring or springs 51 is used, keeping said rollers always in contact with the inclined faces 47 and the casing 48. It is obvious from the construction described, that a rotation of the part having the inclined faces 47 in the direction of the hands of a watch, will carry with it the casing 48, while the reverse motion will have no effect whatever on said casing.

Within the part 52 which is provided with inclined faces 47, is a disk 53, provided with inclined faces 54. Between these inclined faces and the interior of the part 52, are located antifriction rollers 55, kept in contact by springs 56 with the contiguous parts. It is obvious that a rotation of the disk 53 opposite to the hands of a watch will carry with it the part 52, but will have no effect on the casing 48. The movement of the set-works is caused by the movement of the hand lever 57. This hand lever is pivoted on two pins 58 and 59, and links 60 pivotally mounted on these pins are rigidly connected at their upper ends to a pin 61, to which the lever 57 is firmly connected.

The end 49 of the casing 48 is provided with a boss 62, which is connected by means of a bent link 63 to the pin 61, so that a movement of the lever from the position in full lines in Fig. 8 to the position shown in dotted lines, will move the casing 48 in the direction of the hands of a watch. Similarly the disk 53 is provided with a projecting boss 64 to which is attached a curved link 65, the other end of which is attached to the pin 61, and the movement of the lever 57 to the right will carry with it the link 65, moving the disk 53 in the direction opposite to the hands of a watch. The end 49 of the casing 48 is provided with a curved slot 66 to permit the movement of the boss 64.

From the foregoing description it will be seen that the casing 48 rotates in one direction only, and requires no tripping of pawls to push back the head blocks. The same motion of the lever 57, namely, to the right from the position shown in full lines in Fig. 8, produces a forward or reverse motion of the set shaft 27, according as the clutch 33 engages the clutch 38, as shown in Fig. 6, or the clutch 39 is shifted over by the lever 36. The receding or reverse motion of the set shaft is about three times as rapid as the setting motion on account of the proportions of the gearing. The lever 36 may of course be weighted, if desired, like the rod 19.

On the pin 58 is carried the bent arm 67, provided with a stop block 68, and a pivoted locking link 69, which also serves as a hand hold. Bending back the link 69 unlocks the stop block from the quadrant, and it then may be shifted to any desired position. Then when the link is returned to the position shown in Fig. 8, it locks the stop block in any desired position. It is sometimes desirable to move the lever 57 past the stop block 68 without disturbing the position of the latter, and for this purpose I have arranged on the lever 57 a sliding block 70, which under ordinary conditions is adapted to engage the stop block 68, but which by means of the link 71 and the bell crank lever 72 pivoted at 73 to the handle 74 of the lever 57, can be lifted up over the stop block 68.

Having thus described my invention, what I claim as new and desire to secure by Letters Patent of the United States, is:—

1. In saw mill set works, the combination with the carriage and set shaft, of a casting secured to said carriage and carrying the operative parts of said set works, a sliding clutch on said shaft, a casing provided with gear teeth and with a clutch face and also forming one member of a friction clutch, gearing connecting said gear teeth with a gear wheel running loose on said set shaft, said gear wheel being provided with a clutch face, a disk forming with said casing a friction clutch, and means for operating said disk, substantially as described.

2. In saw mill set works, the combination of the set shaft, a casing mounted loosely thereon, provided with a clutch face and with gear teeth on one side, said casing having a hollow cylindrical projection on the other side, a disk provided with inclined cutaway portions on its periphery coöperating with said casing, friction devices between said disk and casing, a gear wheel running loosely on the set shaft, and provided with a clutch face, gearing connecting said gear wheel with the gear teeth on said casing, a slidable clutch provided with teeth on each end keyed to said shaft, and means for operating said disk, substantially as described.

3. In saw mill set works, the combination of the set shaft, a casing mounted thereon provided with a central web, gear teeth and a clutch face on one side, with a hollow cylindrical projection on the other side thereof, a disk provided with inclined recesses located within said cylindrical portion, anti-friction rollers between said disk and said cylindrical portion, springs in contact with said antifriction rollers, a gear wheel provided with a clutch face loosely mounted on said set shaft, gearing connecting said gear wheel with the gear teeth on said casing, a clutch keyed to said set shaft but slidably mounted thereon, said clutch being provided with clutch faces at each end, a pivoted lever for shifting said clutch, and means for operating said disk, substantially as described.

4. In saw mill set works, the combination of a set shaft, a casing loosely mounted thereon provided with internal gear teeth, with a clutch face on one side thereof, and with a projecting cylindrical portion on the other side thereof, means for locking said casing against reverse movement, a gear wheel loosely mounted on said shaft and provided with a clutch face, gearing connecting said gear wheel with the gear teeth in said casing, a clutch keyed to said set shaft but slidably mounted thereon, said clutch being provided with a clutch face at each end, a pivoted lever for shifting said clutch, a disk located within the cylindrical portion of said casing, and provided with inclined cut-away portions on its periphery, anti-friction rollers located in said cut-away portions, springs bearing against said rollers, and means for operating said disk, substantially as described.

5. In saw mill set works, the combination with the carriage and set shaft, of a casting secured to said carriage and carrying the operative parts of said set works, a casting, carrying a quadrant, secured to said first-named casting, a casing provided on one side with gear teeth and a clutch face, and the other side with a projecting cylindrical portion, said projecting portion being cut away on its outer face, anti-friction rollers in said cut away portion, a disk loosely mounted on said set shaft and provided with cut away portions in its periphery, anti-friction rollers in said cut away portions, a casing inclosing the projecting cylindrical portion of said first-named casing, an operating lever, links connecting said last-named casing and said disk with said operating lever, a double faced clutch slidably mounted on said set shaft and adapted to engage with the clutch face on said-first-named casing, said clutch being keyed to said set shaft, a gear wheel, provided with a clutch face, mounted on said set shaft, and device for operating said gear wheel, substantially as described.

6. In saw mill set works, the combination of a set shaft, a gear wheel loosely mounted thereon and provided with a clutch face, a clutch slidably mounted on said set shaft but keyed thereto, a casing provided with gear teeth and loosely mounted on said set shaft, gearing connecting said gear wheel with the gear teeth on said casing, an operating lever, and devices whereby the movement of said lever operates said casing and thereby said set shaft, substantially as described.

7. In saw mill set works, the combination of a set shaft, a clutch slidably mounted thereon and provided with a clutch face on each end, means for shifting said clutch, a casing mounted on said shaft and provided with a clutch face and with gear teeth, a gear wheel mounted on said shaft and provided with a clutch face, gearing connecting said gear wheel and said gear teeth, an operating lever, and friction devices whereby the movement of said lever produces setting or re-setting movement according to the position of said shiftable clutch, substantially as described.

8. In saw mill set works, the combination of a carriage, a casting on said carriage carrying the operative parts of said set works, having outwardly and upwardly extending portions for the reception of a set shaft, said set shaft, a clutch slidably mounted on said set shaft and having a clutch face on each end, means for shifting said clutch and holding it when shifted, a casing mounted on said shaft having a central web and provided with a clutch face and with internal gear teeth on one side of said web, a gear wheel mounted on said shaft and provided with a clutch face, gearing connecting said gear wheel and said gear teeth, an operating lever and friction devices coöperating with said casing and operated by said lever, substantially as described.

In testimony whereof, I affix my signature, in presence of two witnesses.

ALONZO AARON DE LOACH.

Witnesses:
J. CUNNINGHAM,
R. J. DARBY.